(12) United States Patent
Bartha

(10) Patent No.: US 6,872,242 B2
(45) Date of Patent: Mar. 29, 2005

(54) FIREPROOF MIXTURE AND ELASTIFIER FOR THE SAME AND METHOD FOR ITS PRODUCTION

(75) Inventor: Peter Bartha, Bovenden (DE)

(73) Assignee: Refratechnik Holding GmbH, Ismanning (DE)

( * ) Notice: Subject to any disclaimer, the term of this patent is extended or adjusted under 35 U.S.C. 154(b) by 258 days.

(21) Appl. No.: 10/115,573

(22) Filed: Apr. 3, 2002

(65) Prior Publication Data

US 2002/0190246 A1 Dec. 19, 2002

(30) Foreign Application Priority Data

Apr. 5, 2001 (DE) ......................................... 101 17 026

(51) Int. Cl.⁷ .......................... C09K 21/02; C04B 35/01
(52) U.S. Cl. .............................. 106/18.26; 106/16.05; 106/18.11; 106/18.23; 252/601; 501/112; 501/113; 501/125; 501/127; 501/153
(58) Field of Search .......................... 106/15.05, 18.11, 106/18.23, 18.26; 252/601; 501/112, 113, 125, 127, 153

(56) References Cited

U.S. PATENT DOCUMENTS

| | | | | |
|---|---|---|---|---|
| 4,255,195 A | * | 3/1981 | Holter et al. ............ | 106/18.12 |
| 4,703,022 A | * | 10/1987 | Johnson ...................... | 501/95.1 |
| 4,869,468 A | * | 9/1989 | Johnson ....................... | 266/44 |
| 5,129,189 A | * | 7/1992 | Wetscher ..................... | 51/296 |
| 5,443,603 A | * | 8/1995 | Kirkendall ................... | 51/296 |

FOREIGN PATENT DOCUMENTS

JP           52110125 A    *  9/1977

OTHER PUBLICATIONS

Singer et al, Industrial Ceramics, "Dolomite", p. 116, Chemical Publishing Co., Inc. 2112 Fifth Avenue, New York, NY (1963).(no month).*

Definition of "doloma". http://www.maden.hacetteppe.edu.tr/dmmrt/dmmrt349 (No date).*

Derwent Abstract No. 1999–230058, abstract of Chinese Patent Specification No. 1203207A (Dec. 1998).*

* cited by examiner

*Primary Examiner*—Anthony J. Green
(74) *Attorney, Agent, or Firm*—Goodman & Teitelbaum, Esqs.

(57) ABSTRACT

A mixture, in particular for the production of fireproof molded bodies, including a fireproof metal oxidic main component, and an elastifying component containing a mineral emery. If needed, a binder component such as lignin sulphonate is added. A method is provided for the production of the mixture.

21 Claims, 2 Drawing Sheets

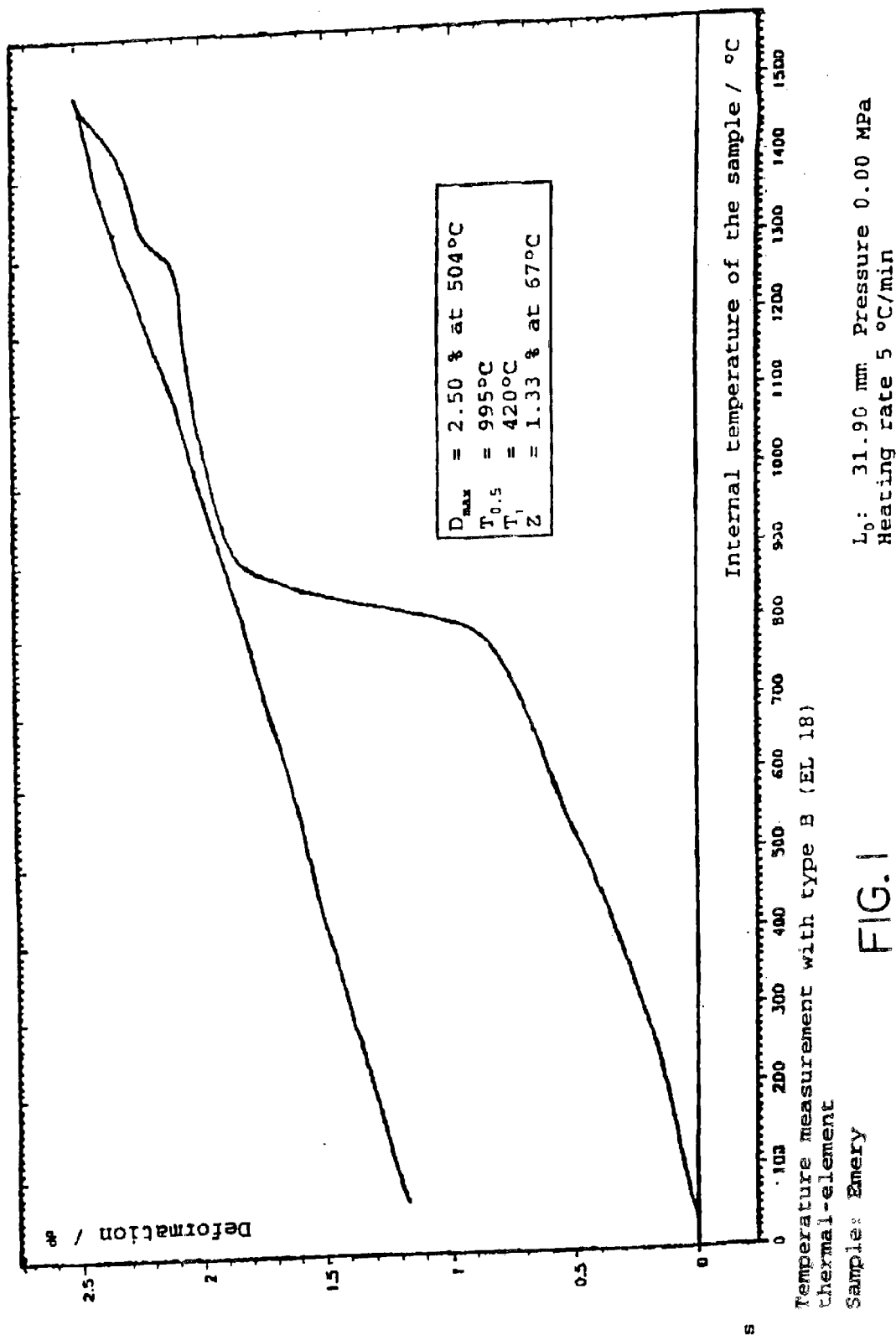

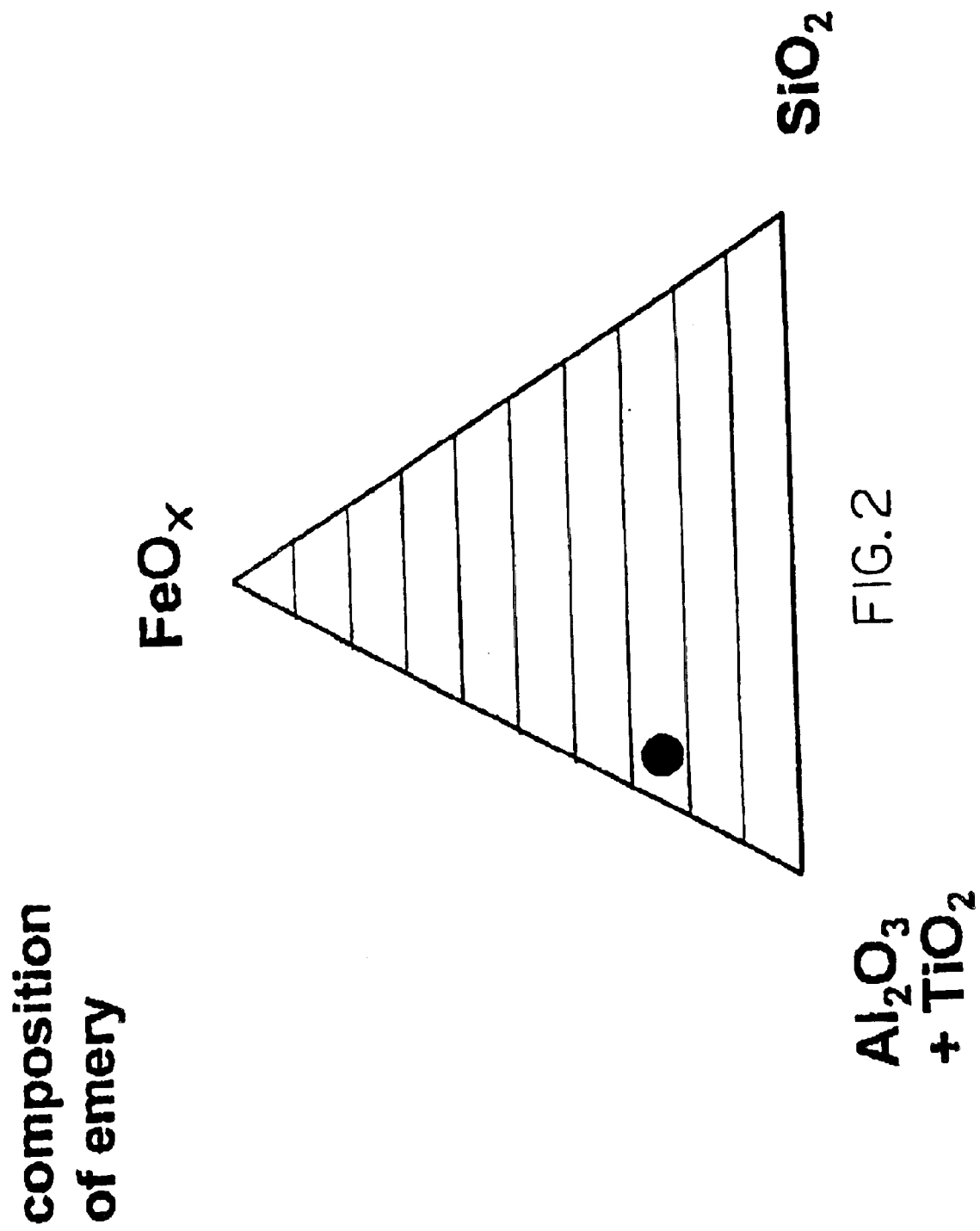

FIREPROOF MIXTURE AND ELASTIFIER FOR THE SAME AND METHOD FOR ITS PRODUCTION

BACKGROUND OF THE INVENTION

The invention relates to a fireproof mixture, in particular on the basis of magnesia, as well as an elastifier therefor and a method for producing the mixture and a moulded body thereof.

Hereinafter, the carrier of the refractory quality and thus customarily also the main component of a fireproof moulded body or of fireproof masses is termed a resistor. This resistor can, in the most general case, be a metallic oxide, mineral, fireproof substance such as MgO, $Al_2O_3$, doloma or similar.

Hereinafter, the term elastifier is used to designate minerals which lead to an increase of the thermal fatigue resistance of a mixture of resistor and elastifier—as opposed to a pure resistor—as a result of an inherent, relatively high refractory quality, but an extension under temperature different from the resistor, through formation of micro-fissures and further effects.

Fireproof moulded bodies, in particular basic fireproof materials on the basis of magnesia, doloma, chromite and/or spinel ($MgAl_2O_4$), are used in all high-temperature processes with basic slag attacks, such as cement, lime, dolomite, iron and steel production and also in production of nonferrous metals and in the glass industry as lining materials for furnaces, vessels and treatment systems. With high refractory quality and good chemical resistances, the materials and moulded bodies are however highly brittle, i.e. have a high module of elasticity, thus resulting in negative influences on the service life with regard to the heat extension, stresses, mechanical load and the thermal fatigue resistance.

In addition, it is known that fireproof moulded bodies are also produced on the basis of $Al_2O_3$, with in particular bauxite, tabular oxide of aluminium or fused corundum being used as the raw material. The main fields of application for such stones are electrical furnace lids and kettles in the steel industry as well as cement kilns and furnaces in the glass industry.

It is known that the high thermal expansion stresses of basic fireproof products or moulded bodies are reduced by laying the fireproof stones with a mortar joint, metallic inserts such as sheets perforated sheets or nets arranged between them.

Further, numerous measures have been taken in the past in order to improve the thermal fatigue resistance, in particular of basic fireproof materials. Harders/Kienow, Feuerfestkunde, Herstellung, Eigenschaften und Verwendung feuerfester Baustoffe, Springer Verlag, 1960, Chapter 5.5, pages 754 and 755, states that the thermal fatigue resistance can be distinctly improved by the addition of chrome ore (magnesium chromate) and by a so-called mixture gap, i.e. minimisation of the share of medium grains (0.2 to 0.6 mm). However, a decisive disadvantage of the mixture gap is, on the one hand, that its effect is only sufficiently high in combination with a thermal fatigue resistance component such as magnesia or chrome ore in magnesia chrome stones if, on the other hand, no optimum grain packing density can be achieved in use of the mixture gap, as is required to achieve a high infiltration resistance against slags. Further, the quantity of chrome ore and the optimum grain fraction of the chrome ores has been defined with a view to the addition of chrome ore (e.g. Harders/Kienow, page 754). In order to achieve a satisfactory thermal fatigue resistance, quantities of chrome ore between 15 and 30% by weight have been recognised as being suitable. The elastifying effect of the chrome ore in moulded bodies on the basis of magnesia has been unsurpassed up to now. Decisive disadvantages of the use of chrome ore as an elastifier (thermal fatigue resistance component) are however that material fatigue takes place in a change of the furnace atmosphere and that the trivalent chrome oxide in the chrome ore is converted into toxic hexavalent chrome oxide by oxidation under the effect of alkalis, with all the problems connected with this from a work-hygiene and disposal point of view.

Attempts were made at an early stage (AT-PS 158208) to add aluminium oxide, corundum and aluminium powder to magnesia stones in order to improve the thermal fatigue resistance, with spinel (MgAl3O4) being formed when the stones are burnt in situ. The spinel formed in this way is concentrated in the matrix, which means that the matrix decisive for the strength is preferably destroyed in the attack of such stones by slags. In addition, the improvement of the thermal fatigue resistance which can be achieved is limited, as the share of $Al_2O_3$ necessary for a decisive improvement would have to be way above 8% by weight. However, this is not possible due to the excessive growth of the stones as a result of an increase in volume in the matrix, as otherwise dimensional accuracy and mechanical strength become too low and the porosity too high. A considerable improvement of both the heating fatigue resistance and also the chemical resistance of magnesia stones was only achieved by the addition of pre-synthesised magnesium aluminium spinel in the form of sintered or fused spinel, with the customary added quantities being between 15 and 25% by weight.

DE 41 19 251 A1 manifests that a spinel clinker of the magnesium oxide/aluminium oxide type, containing $Fe_2O_3$ and $TiO_2$ on the borders between the crystal grains, is used in a chamotte slab.

Further, DE 44 03 869 manifests a fireproof ceramic mixture essentially containing MgO sinter as the carrier of the refractory quality, with a spinel of the hercynite type being used as an elastifier.

The thing common to all the attempts to replace the chrome ore with its outstanding elastification property for in particular basic fireproof products by materials with less reservations with regard to environmental hygiene is that, although elastification effects can be achieved, they are inferior to those of the chrome ore. A further disadvantage is that the elastifiers used, such as hercynite, fused or sintered spinel or molten zirconium oxide are synthetic raw materials which are considerably more expensive than the natural material chrome ore.

Fireproof moulded bodies and thus also the elastifying components are increasingly burdened in use, for example by greater thermal loads and thus increasing mechanical forming in industrial kilns (cement kilns, rotary lime kilns, steel casting ladles etc.) or by the increasing use of secondary combustion materials, which have a negative influence on the annexing property otherwise required, for example in rotary cement kilns, and lead to an undesired change of temperature with the accompanying destruction of the stones due to a reduced formation of annexing or flaking of annexing.

BRIEF SUMMARY OF THE INVENTION

The task of the invention is to provide a mixture for fireproof moulded bodies and an elastifier, the elastification effect of which is very high and which is fres of reservations as regards environmental hygiene and is reasonably priced in addition.

This task is solved with a mixture, in particular for fireproof moulded bodies, with the features set forth below.

The task is further to create a method for the production of a mixture, making use of the elastifier. This task is solved with a method with the features set forth below.

Advantageous further versions are also shown below.

In the invention, the natural mineral emery leads to an elastification considerably exceeding the elastification performances of known elastifiers reached up to now.

The mineral emery, for example of grained, black-brown or brown emery stone, which has resulted in a contact or regionally metamorphous way (for example Turkey, Naxos, Ural, Massachusetts, Eastern Steiermark), manifests a chemical composition comprising approximately 5.5% $SiO_2$, 64.7% $Al_2O_3$, 25.1% $Fe_2O_3$, 3% $TiO_2$, 0.5% CaO and 0.4 MgO, the rest being impurities. The composition has been registered for example in the $FeO$—$Al_2O_3/TiO_2$—$SiO_2$ pseudo three-material system (FIG. 2). As it is a natural mineral, the individual shares of the above mentioned chemical compounds in emery can deviate, with the result that 25 to 30% $Fe_2O_3$ and 62 to 75% $Al_2O_3$ are contained in the most general form. The remaining percentages are distributed amongst $SiO_2$, $TiO_2$, CaO and MgO.

The following Table 1 contains elastifiers used up to now. The examples entail 4 typical mixtures of fireproof, basic moulded bodies with the G modules which can typically be achieved up to now (% figures as % by weight) The added quantities of the elastifiers spinel, chrome ore, hercynite and zirconium oxide known up to now correspond to amounts typical in the trade.

TABLE 1

|  | V1 | V2 | V3 | V4 |
|---|---|---|---|---|
| Magnesia | 82% | 80% | 95% | 95% |
| Spinel | 18% | | | |
| Chrome ore | | 20% | | |
| Hercynite | | | 5% | |
| Zirconium oxide | | | | 5% |
| G module | 8–12 GPa | 8–12 GPa | 15–20 GPa | 15–20 GPa |

It can be seen from the table that the G module, which can in fact be achieved in order to bring about satisfactory results in thermo-mechanically burdened systems, for example rotary cement kilns, by addition of comparatively high amounts of spinels or chrome ore, is comparatively high in the case of hercynite or zirconium oxide. Here, an impairment of the behaviour in use with a high mechanical load is to be expected, as can be calculated from known relevant equations, for example that by Meedom (ZKG 29 (1976), no. 12, pp. 568–571).

Products such as those shown in the table are currently in use with more or less success.

BRIEF DESCRIPTION OF THE SEVERAL VIEWS OF THE DRAWINGS

The invention is explained in an exemplary way on the basis of a diagram, showing:

FIG. 1 a heat expansion curve of emery;

FIG. 2 the position of the emery in the $Fe_2O_3$—$Al_2O_3/TiO_2$—$SiO_2$ composition triangle.

DETAILED DESCRIPTION OF THE INVENTION

Surprisingly, the elastification in a moulded body of a magnesia sinter and the mineral emery is considerably higher than with the elastifiers stated in the table. The specifically selected natural material emery essentially comprises the oxides $Al_2O_3$ and $Fe_2O_3$ as well as the subsidiary phase $SiO_2$. The effect of the emery is surprising; a module of elasticity distinctly below the figures which can be achieved with the elastifiers customary up to now, such as synthetic spinel, synthetic zirconium oxide, synthetic hercynite and even natural chrome ore, can be achieved.

A further surprise is that the natural mineral emery has a course of heat expansion favourable for use as an elastifier, and a simultaneous high refractory quality and in addition high resistance against slags and alkalis, in particular at extremely high application temperatures, can be guaranteed.

FIG. 1 shows the heat expansion graph of the natural mineral emery selected as an elastifier in the invention. As can be seen from FIG. 1, the emery manifests an anomaly in heat expansion in the first heating up with a larger phase commencing around 750° C. and ending around 1000° C. After this, the heat expansion is approximately constant up to 1250° C., at which point a further slight phase is formed again. In the subsequent cooling, one sees that the deformation becomes linear and constantly less, with a remaining expansion of 1.2% linear remains after the initial temperature has been reached.

With the first heat expansion phase and the small, second heat expansion phase, a primary elastification in the structure can be generated, leading to successful elastification of the moulded body during the first burning of the same. Possible causes for the elastification and disturbances of the structures such as stresses, micro-fissures and other effects, which lead to stresses brought in from the outside being broken down. Although micro-fissures can be "healed" by solid-state reactions (sintering), the elastifying effect of the emery is so high, even after the primary elastification, that a new formation of micro-fissures is imaginable and the micro-fissure system or other disturbances in the structure caused in the primary elastification can be renewed again and again (secondary elastification). This could be what the surprising elastification performance of the emery is to be put down to. Such micro-fissures are used in particular along the grain borders.

In comparison with this, the "pure" minerals corundum and hematite, of which emery is theoretically composed, manifest other coefficients of thermal expansion, with the coefficient of thermal expansion of corundum being $6.2 \times 10^{-6}$ $K^{-1}$ and that of hematite $7.6 \times 10^{-6}$ $K^{-1}$. The coefficient of thermal expansion of the periclasite (MgO) representing the resistor is $13.5 \times 10^{-6}$ $K^{-1}$, with that of the MA-spinel elastifier frequently used being $8.5 \times 10^{-6}$ $K^{-1}$. The courses of the expansion graphs of the above mentioned minerals are constant, unlike that of emery. The behaviour of the emery, i.e. its lack of constancy in thermal expansion, cannot be explained on the basis of the constant expansion graphs for a corresponding mixture of corundum and hematite.

Naturally, emery can also be used as an elastifier in combination with other elastifiers. For example, joint use with hercynite or MA-spinel is possible. In addition, the emery can also be combined with bauxites used as elastifiers. If required, the share of primary elastification can be lowered with a per se constant secondary elastification as a result of the combination. Further, not only the use of the natural mineral emery, but also the use of a synthesised mineral with the composition of the emery is also possible in its place.

This synthetic mineral can, for example, be produced by sintering or fusing the initial substances ferric oxide (calculated as $Fe_2O_3$) and magnesium oxide.

The invention is explained below on the basis of an example.

A fused magnesia with a maximum grain of 4 mm and a grain distribution corresponding to a typical Fuller curve is mixed with the natural mineral emery in a grain distribution of 0.5 to 4 mm. In order to bind the dry mixture, a necessary quantity of lignin sulphonate is added and the homogenised mixture fed to a hydraulic press customary for the fireproof area. The combination or the mixture is pressed at a pressure of 130 Megapascal. The moulded bodies obtained in this way are dried in a drying step at above 100° C. After this, the moulded bodies are burnt at 1470° C. This sintering temperature is above the formation temperature of the mixed spinel which forms.

Thus, as indicated in the above example, the elastifier includes a grain distribution corresponding to a Fuller curve, where the elastifying component exists in a grain of at lease 0 to 10 mm, which preferably is 0.5 to 4 mm.

The following table portrays the thermo-mechanical properties achieved as a function of the amount of emery added. For this, 3 exemplary mixtures were produced according to the example above, with the share of emery being increased from 2 to 10% at the cost of the share of magnesia.

TABLE 2

|  | V5 | V6 | V7 |
|---|---|---|---|
| Magnesia | 98% | 95% | 90% |
| Emery | 2% | 5% | 10% |
| G module | 10.4 GPa | 7.5 GPa | 2.7 GPa |

As can be seen from the table, the elasticity, characterised by the G module, can be varied within wide limits and is a function of the amount of the natural mineral emery added in accordance with the invention within these limits. It is surprising that even small amounts of only 2% of emery lead to elastic modules like those also observed for elastifiers known up to now. Under the peripheral condition of a strength of fireproof stones necessary for the use in order to counteract the stresses occurring, specifically bending stresses, for which ceramic products are most sensitive in general, with a figure of about 3 Megapascal, the G module can be reduced to a figure of 2.7 Gigapascal. Such a low figure has not yet been achieved in any case for fireproof stones. The mechanism which leads to the dramatic reduction of the G module is not yet known. It is presumably the formation of micro-fissures between the resistor and the added emery already described, caused by the primary and secondary elastification, or it is disturbances caused by differing thermal expansion coefficients.

The moulded bodies produced in accordance with the invention can be used beneficially wherever high changes in temperature occur and mechanical and thermo-mechanical stresses occur. For example, this can be sinter and transition zones of cylindrical rotary kilns in the stones and soils industry, in the ferrous and non-ferrous metal industry as well as fusion and treatment vessels in the ferrous and non-ferrous metal industry.

A benefit in the mixture and the moulded body according to the invention is that an elastification of the moulded body is achieved by the addition of the emery which is clearly above the elastification by chrome ore achieved up to now. A further benefit is that the elastifier used in accordance with the invention is by no means toxic and can thus be used completely free of reservations, both with regard to industrial hygiene and also disposal.

Yet another advantage is the fact that it is a raw material occurring in natural deposits and in quantities worth mining. No large amounts of energy are necessary for its treatment or production, such as, for example, in the production of synthetic raw materials like fused spinel. Another benefit is the fact that this natural raw material produces a higher elastification performance in moulded bodies with considerably lower quantities than the synthetic elastifiers and is thus more favourable in price in this regard.

It is noted, that the elastifying component is contained in the mixture of the present invention in quantities of 0.5 to 15 M %, and that the fireproof metal oxidic main component is contained in quantities of 88 to 99.5 M %. It is well known that "M %" means—weight-%—, which is written—wt.-%—.

Furthermore, the term "doloma" is well known to a person skilled in the art to be used for—calcined dolomite—.

Also, as indicated, the fireproof metal oxidic main component is essentially made of $AL_2O_3$, where the fireproof metal oxidic main component exists in a grain of at least 0 to 10 mm, which preferably is 0 to 5 mm.

What is claimed is:

1. A mixture for production of fireproof moulded bodies, comprising:
    a) a fireproof metal oxidic main component,
    b) an elastifying component containing a mineral emery, the mineral emery including $Fe_2O_3$ and $Al_2O_3$, the elastifying component having a grain size of at least 0.5 to 10 mm, and
    c) a binding component.

2. Mixture according to claim 1, wherein the elastifying component is a natural mineral emery.

3. Mixture according to claim 1, wherein the elastifying component is a synthetic material provided with a composition of emery.

4. Mixture according to claim 1, wherein the elastifying component is a mixture of a natural mineral emery and a synthetic mineral provided with a composition of emery.

5. Mixture according to claim 1, wherein the elastifying component additionally contains bauxites rich in iron.

6. Mixture according to claim 1, wherein the elastifying component is primarily $Fe_2O_3$ and $Al_2O_3$.

7. Mixture according to claim 1, wherein the elastifying component is contained in the mixture in quantities of 0.5 to 15 wt.—%.

8. Mixture according to claim 1, wherein the fireproof metal oxidic main component is contained in quantities of 88 to 99.5 wt.—%.

9. Mixture according to claim 1, wherein the fireproof metal oxidic main component contains fused magnesia and/or sintered magnesia.

10. Mixture according to claim 1, wherein the fireproof metal oxidic main component comprises an oxide of aluminium.

11. Mixture according to claim 1, wherein the fireproof metal oxidic main component is essentially made of MgO.

12. Mixture according to claim 1, wherein the fireproof metal oxidic main component is essentially made of $Al_2O_3$.

13. Mixture according to claim 1, wherein the fireproof metal oxidic main component contains CaO.

14. Mixture according to claim 1, wherein the fireproof metal oxidic main component is essentially made of doloma.

15. Mixture according to claim 1, wherein the fireproof metal oxidic main component has a grain size of greater than 0 to 10 mm.

16. Mixture according to claim 1, wherein the fireproof metal oxidic main component includes a grain size distribution corresponding to a Fuller curve.

17. Mixture according to claim 1, wherein the elastifying component has a grain size of at least 0.5 to 4 mm.

18. Mixture according to claim 1, wherein the elastifying component includes a grain size distribution corresponding to a Fuller curve.

19. Mixture according to claim 1, wherein subsidiary components comprising at least antioxidants and pressing aids are contained therein.

20. Mixture according to claim 1, wherein the binding component includes lignin sulphonate.

21. Mixture according to claim 15, wherein the fireproof metal oxidic main component has a grain size of greater than 0 to 5 mm.

* * * * *